United States Patent
Klopfenstein et al.

(10) Patent No.: US 9,042,705 B1
(45) Date of Patent: May 26, 2015

(54) SYSTEM FOR PROGRAM SPECIFIC INFORMATION ERROR MANAGEMENT IN A VIDEO DECODER

(75) Inventors: Scott Edward Klopfenstein, Indianapolis, IN (US); Daniel Richard Schneidewend, Fishers, IN (US)

(73) Assignee: THOMSON LICENSING, Boulogne-Billancourt (FR)

( * ) Notice: Subject to any disclaimer, the term of this patent is extended or adjusted under 35 U.S.C. 154(b) by 1702 days.

(21) Appl. No.: 10/030,797

(22) PCT Filed: Jun. 20, 2000

(86) PCT No.: PCT/US00/16928
§ 371 (c)(1), (2), (4) Date: May 13, 2002

(87) PCT Pub. No.: WO01/05157
PCT Pub. Date: Jan. 18, 2001

(51) Int. Cl.
*H04N 9/80* (2006.01)
*H04N 5/76* (2006.01)
*H04N 21/84* (2011.01)
*H04N 5/44* (2011.01)

(52) U.S. Cl.
CPC ......... *H04N 21/8402* (2013.01); *H04N 5/4401* (2013.01)

(58) Field of Classification Search
USPC ........ 386/83, 239–248, 291–299; 725/39, 43, 725/44; 726/39, 43, 44
See application file for complete search history.

(56) References Cited

U.S. PATENT DOCUMENTS

| | | | |
|---|---|---|---|
| 5,617,565 A * | 4/1997 | Augenbraun et al. | 707/4 |
| 5,754,651 A | 5/1998 | Blatter et al. | 380/20 |
| 5,812,976 A | 9/1998 | Ryan | 704/201 |
| 5,818,539 A | 10/1998 | Naimpally et al. | 348/512 |
| 5,828,416 A | 10/1998 | Ryan | 348/512 |
| 5,838,678 A | 11/1998 | Davis et al. | 370/389 |

(Continued)

FOREIGN PATENT DOCUMENTS

| | | | |
|---|---|---|---|
| EP | 0921689 | 6/1999 | H04N 7/52 |
| EP | 0975109 A1 | 1/2000 | |

(Continued)

*Primary Examiner* — Hung Dang
(74) *Attorney, Agent, or Firm* — Joel M. Fogelson; Vincent E. Duffy (57) ABSTRACT

A processing system decodes packetized program information including ancillary program specific information comprising a plurality of hierarchically ordered information tables. The ancillary information is used in acquiring and decoding packetized program information to provide a video program for display. The processing system employs a method involving detection of a mismatch between a version number of a first table of the program specific information (e.g. a virtual channel table (VCT), or channel information table (CIT)) and a corresponding version number of the first table conveyed in a second table (e.g. a master guide table (MGT)). If a mismatch is detected, the first and second tables are forced to contain a compatible first table version number. The packetized program information is decoded to provide a video program for display using the program specific information including the first and second tables including the forced compatible version number. A detected mismatch may also be disregarded to enable the decoding of the packetized program information and a User's channel line-up may be edited to remove channels associated with a detected mismatch or other program specific information error condition.

18 Claims, 4 Drawing Sheets

(56) References Cited

U.S. PATENT DOCUMENTS

| | | | |
|---|---|---|---|
| 5,838,873 A | 11/1998 | Blatter et al. | 386/95 |
| 5,844,478 A | 12/1998 | Blatter et al. | 348/474 |
| 5,844,595 A * | 12/1998 | Blatter et al. | 455/83 |
| 5,892,910 A | 4/1999 | Safadi | 395/200.47 |
| 5,917,830 A | 6/1999 | Chen et al. | 370/487 |
| 6,026,506 A | 2/2000 | Anderson et al. | 714/746 |
| 6,035,304 A | 3/2000 | Machida et al. | |
| 6,445,923 B1 * | 9/2002 | Fujimori et al. | 455/434 |
| 6,763,522 B1 * | 7/2004 | Kondo et al. | 725/39 |
| 6,763,552 B1 * | 7/2004 | Kitamura et al. | 16/337 |
| 7,516,467 B1 | 4/2009 | Arai et al. | |

FOREIGN PATENT DOCUMENTS

| | | | | |
|---|---|---|---|---|
| JP | 10-21299 A | 1/1998 | | |
| JP | 11-168666 A | 6/1999 | | |
| JP | 11317713 A | 11/1999 | | |
| JP | 200032426 A | 1/2000 | | |
| WO | 97/46010 | 12/1997 | | H04N 5/44 |
| WO | 98/38765 A2 | 9/1998 | | |
| WO | 99/03268 | * | 1/1999 | |

\* cited by examiner

MASTER GUIDE TABLE (MGT)

| Syntax | Bits | Format |
|---|---|---|
| master_guide_table_section () { | | |
|     table_id | 8 | 0xC7 |
|     section_syntax_indicator | 1 | '1' |
|     private_indicator | 1 | '1' |
|     zero | 2 | '00' |
|     section_length | 12 | uimsbf |
|     table_id_extension | 16 | 0x0000 |
|     reserved | 2 | '11' |
|     version_number | 5 | uimsbf |
|     current_next_indicator | 1 | '1' |
|     section_number | 8 | 0x00 |
|     last_section_number | 8 | 0x00 |
|     protocol_version | 8 | uimsbf |
|     tables_defined | 16 | uimsbf |
|     for (i=0;i<tables_defined;i++) { | | |
|         table_type | 16 | uimsbf |
|         reserved | 3 | '111' |
|         table_type_PID | 13 | uimsbf |
|         reserved | 3 | '111' |
|         table_type_version_number | 5 | uimsbf |
|         number_bytes | 32 | uimsbf |
|         reserved | 4 | '1111' |
|         table_type_descriptors_length | 12 | uimsbf |
|         for (k=0;k<N;k++) | | |
|             descriptor() | var | |
|     } | | |
|     reserved | 4 | '1111' |
|     descriptors_length | 12 | uimsbf |
|     for (l = 0;l< N;l++) | | |
|         descriptor() | var | |
|     CRC_32 | 32 | rpchof |
| } | | |

135 → table_type_version_number

FIG. 1

VIRTUAL CHANNEL TABLE (VCT)

| Syntax | Bits | Format |
|---|---|---|
| terrestrial_virtual_channel_table_section () { | | |
|     table_id | 8 | 0xC8 |
|     section_syntax_indicator | 1 | '1' |
|     private_indicator | 1 | '1' |
|     zero | 2 | '00' |
|     section_length | 12 | uimsbf |
|     transport_stream_id | 16 | uimsbf |
|     reserved | 2 | '11' |
|     version_number | 5 | uimsbf |
|     current_next_indicator | 1 | bsibf |
|     section_number | 8 | uimsbf |
|     last_section_number | 8 | uimsbf |
|     protocol_version | 8 | uimsbf |
|     num_channels_in_section | 8 | uimsbf |
|     for (i=0;i<num_channels_in_section;i++) { | | |
|         short_name | 7*16 | unicode™ BMP |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bsibf |
|         hidden | 1 | bsibf |
|         reserved | 6 | '111111' |
|         service_type | 6 | uimsbf |
|         source_id | 16 | uimsbf |
|         reserved | 6 | '111111' |
|         descriptors_length | 10 | uimsbf |
|         for (i=0;i<N;i++) { | | |
|             descriptors() | | |
|         } | | |
|     } | | |
|     reserved | 6 | '111111' |
|     additional_descriptors_length | 10 | uimsbf |
|     for (j=0; j< N;j++) { | | |
|         additional_descriptors() | | |
|     } | | |
|     CRC_32 | 32 | rpchof |
| } | | |

140 — version_number

SYSTEM FOR PROGRAM SPECIFIC INFORMATION ERROR MANAGEMENT IN A VIDEO DECODER

This application claims the benefit under 35 U.S.C. §365 of International Application PCT/US00/16928, filed Jun. 20, 2000, which claims the benefit of U.S. Provisional Application No. 60/143,611, filed Jul. 13, 1999.

BACKGROUND

This invention is related to the field of digital signal processing, and more particularly to the processing of imperfect program specific information for use in the acquisition and decoding of packetized video, audio and other information.

In video broadcast and processing applications, digital video data is typically encoded to conform to the requirements of a known standard. One such widely adopted standard is the MPEG2 (Moving Pictures Expert Group) image encoding standard, hereinafter referred to as the "MPEG standard". The MPEG standard is comprised of a system encoding section (ISO/IEC 13818-1, 10 Jun. 1994) and a video encoding section (ISO/IEC 13818-2, 20 Jan. 1995). Data encoded to the MPEG standard is in the form of a packetized datastream which typically includes the data content of many program channels (e.g. content corresponding to cable television channels 1-125). Further, several digital services and channels may occupy the frequency spectrum previously occupied by a single analog channel. A 6 MHz bandwidth previously allocated to an analog NTSC compatible broadcast channel may now be split into a number of digital sub-channels offering a variety of services. For example, the broadcast spectrum for RF channel 13 may be allocated to sub-channels including a main program channel, a financial service channel offering stock quotes, a sports news service channel and a shopping and interactive channel. In addition, data conveyed in different sub-channels may be in different data formats (e.g. analog, digital etc.).

In such a digital video system, the processing of ancillary program specific information used in acquiring and decoding packetized data for display on a TV, for example, presents a number of problems. The ancillary program specific information includes data used in identifying and assembling packets comprising selected programs and also includes program guide and text information associated with the transmitted program data. The ancillary program specific information is derived from different broadcast sources e.g. from each broadcaster such as ABC, CBS, NBC, etc., and collated and transmitted as composite program specific information in a packetized datastream together with the program content data of many program channels (e.g. channels 1-125). As a result of this processing, the ancillary program specific information received by a video decoder following transmission may include errors. These errors may be introduced through the collation process, or through broadcaster misunderstandings and incompatibilities as well as through data corruption caused by the transmission process itself. A system, according to the invention principles, acquires and processes ancillary program specific information to alleviate the problems created by these errors.

SUMMARY

A processing system decodes packetized program information including ancillary program specific information comprising a plurality of hierarchically ordered information tables. The ancillary information is used in acquiring and decoding packetized program information to provide a video program for display. The processing system employs a method involving detection of a mismatch between a version number of a first table of the program specific information (e.g. a virtual channel table (VCT), or channel information table (CIT)) and a corresponding version number of the first table conveyed in a second table (e.g. a master guide table (MGT)). If a mismatch is detected, the first and second tables are forced to contain a compatible first table version number. The packetized program information is decoded to provide a video program for display using the program specific information including the first and second tables including the forced compatible version number.

In another feature, a detected mismatch is disregarded to enable the decoding of the packetized program information. In addition a User's channel line-up is edited to remove channels associated with a detected mismatch or another program specific information error condition.

DETAILED DESCRIPTION OF THE DRAWINGS

Program specific information (PSI) includes program guide data and information for use in identifying and assembling individual data packets to recover the content of selected program channels. Program specific information may be conveyed in MPEG compatible format (per section 2.4.4 of the MPEG systems standard) or may be conveyed in a format compatible with the Program and System Information Protocol for Terrestrial Broadcast and Cable, published by the Advanced Television Systems Committee (ATSC), 23 Dec. 1997, hereinafter referred to as the PSIP standard or other ATSC standards. Further, the data structure elements may be formed in accordance with proprietary or custom requirements of a particular system. Program specific information is typically structured into multiple hierarchically arranged and inter-linked tables. The tables consist of arrays of data and parameters which are used to enumerate and describe collections or sequences of TV channels, TV programs, channel parameters, program parameters, associated multimedia objects and object parameters, etc. An exemplary PSIP hierarchical table arrangement includes a Master Guide Table (as exemplified in the PSIP compatible MGT of FIG. 1), Virtual Channel Tables (VCT-1, VCT-2, etc. (as exemplified in the PSIP compatible VCT of FIG. 2), Event Information Tables (EIT-1, EIT-2), and optional tables such as Extended Channel Information Tables (EVCT-1, EVCT-2, EVCT-3), a Network Information Table (NIT) and Extended Event Information Tables (EEIT-1, EEIT-2).

Figure 1:
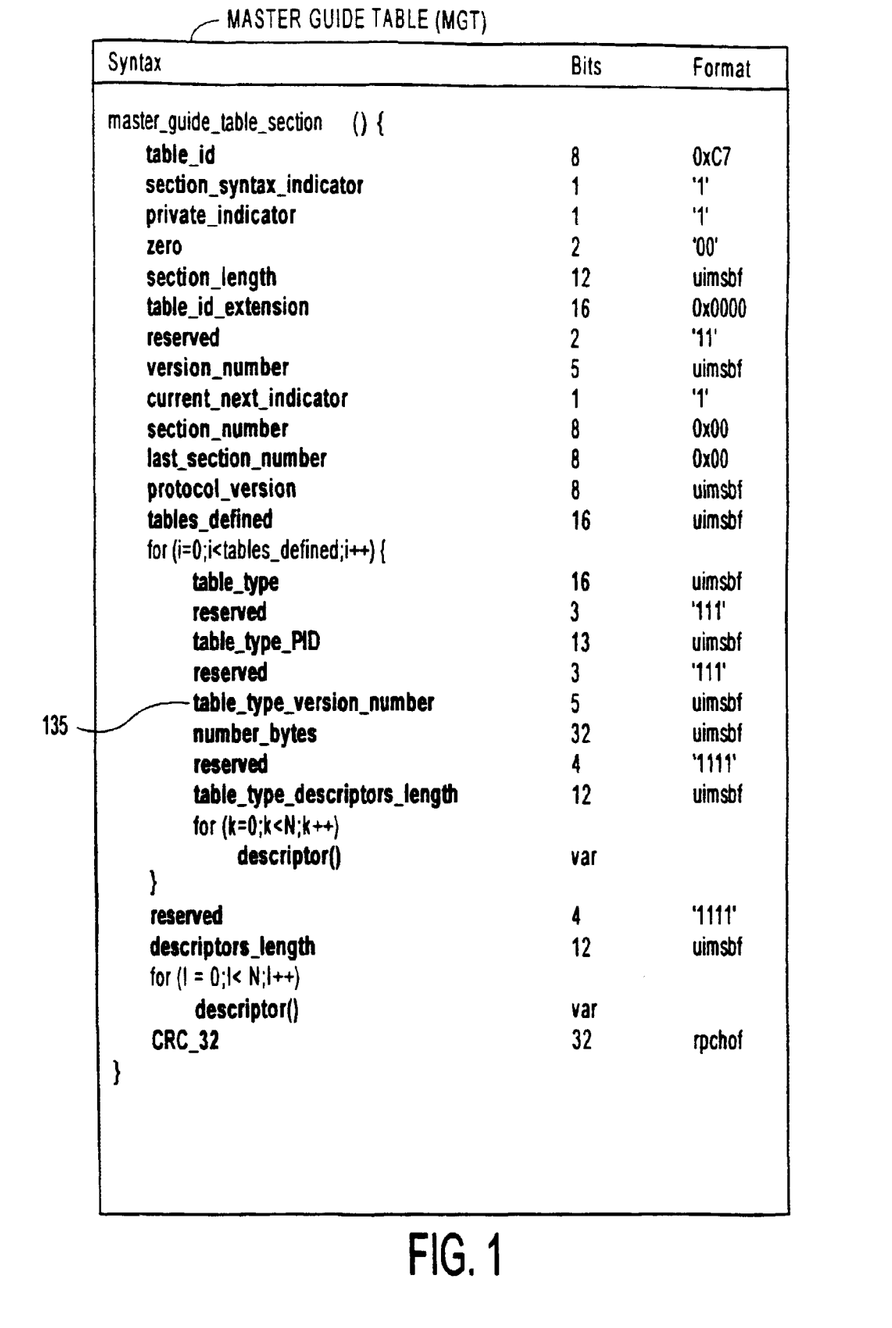
FIG. 1 shows an exemplary Master Guide Table (MGT) conveying version numbers of program specific information tables.
Figure 2:
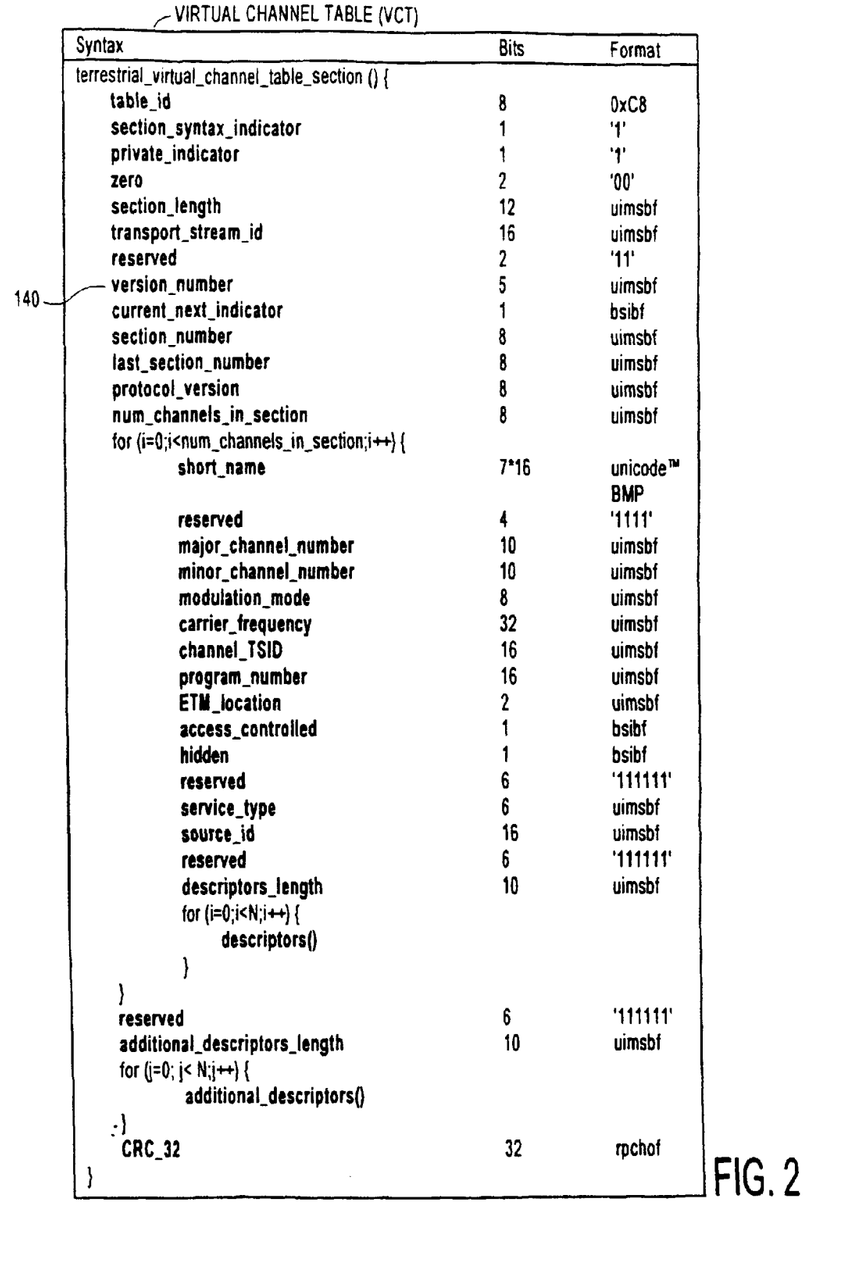
FIG. 2 shows an exemplary Virtual Channel Table (VCT) containing its own version number.

The MGT (e.g. as shown in FIG. 1) contains information for use in acquiring program specific information conveyed in other tables including a VCT (e.g. as shown in FIG. 2). Specifically, the MGT contains a list including the version number, length, and Packet Identifier (PID) of all other PSIP tables that are being sent on an individual channel. The other tables also contain their respective individual version numbers, which in normal operation, should match their corresponding version number conveyed in the MGT. The VCT contains a list of attributes for channels that are carried in a particular transport stream and includes information for tuning and navigation to receive a User selected program channel. The EIT contains descriptive lists of programs (events) receivable on the channels listed in the VCT. Either a VCT, EIT or other table may be used to convey information enabling a user to select and tune to a particular program. A VCT is typically used to convey parameters for acquiring audiovisual program content data that remains constant over several events (TV programs). An EIT is typically used to convey parameters of audiovisual program content data that remain constant for an event (individual TV program). The NIT (an optional table) contains parameter lists for the entire broadcast network (terrestrial, satellite, cable, etc.). The EVCT and EEIT are extension tables accommodating additional VCT and EIT information. Additional program specific information describing and supplementing items within the hierarchical tables is conveyed within descriptor information elements.

The inventors have recognized that a problem may occur in performing a validity check of version number compatibility for individual program specific information tables. A validity check for a VCT, for example, involves comparison of the VCT version number conveyed within the VCT itself with the corresponding VCT version number conveyed within the MGT. Similar version number checks are performed for the other program specific information tables. A version number incompatibility may arise for a number of different reasons. A broadcaster may erroneously transmit an MGT and VCT that have incompatible version numbers, but that are in all other respects valid, for example. Alternatively, a version number mismatch may occur if, after an MGT is acquired, but before a VCT is acquired, program specific information tables are updated. The updated tables contain new version numbers and this results in the MGT conveying an older VCT version number than the version number of the acquired VCT. Version number incompatibility may also arise from data corruption in the transmission or acquisition process and in other ways.

In a decoding system, upon detection of a version number incompatibility between an MGT and VCT, for example, one initial response is to re-acquire the VCT. The VCT is typically re-acquired rather than the MGT because the MGT is monitored more frequently and is therefore more likely to be current. The MGT is more frequently monitored for changes because it comprises an index of the version numbers of the other tables and therefore the MGT may be efficiently used to determine which other tables have changed and need to be re-acquired.

If a broadcaster erroneously transmits an MGT and VCT that have incompatible version numbers, but that are in all other respects valid, the re-acquisition of either the VCT or MGT does not resolve the incompatibility. This is because under these conditions the MGT will never match the VCT. This may potentially produce a failure mode involving continuous re-acquisition of a VCT or MGT. In contrast, if a version number mismatch occurs through the intervening update of program specific information tables occurring between the acquisition of an MGT and a VCT, the re-acquisition of the VCT successfully resolves the incompatibility. However, the version number incompatibility is resolved at the expense of incurring additional delay in re-acquiring the VCT. The re-acquisition of the VCT also may successfully resolve version number incompatibility (at the expense of the additional delay) arising from data corruption in the MGT and VCT transmission or acquisition process. Once the version number incompatibility is resolved channel information may be retrieved from the VCT and used for tuning and navigation to receive a User selected program channel.

The inventors have recognized that the version number incompatibility and associated re-acquisition delay problems may be minimized or eliminated by advantageously forcing compatibility of a VCT (or other table) version number and the corresponding version number conveyed in an MGT (or other table). Specifically, the MGT may be modified in memory when a VCT (with a different corresponding version number to that conveyed within the MGT) is initially acquired. Therefore, when the MGT and VCT are checked for validity, the version numbers match, and channel information from the VCT may be used in channel acquisition. In another embodiment, the version number incompatibility may be disregarded and the VCT information used for channel acquisition provided that there is an absence of other indications of a disabling corruption of the VCT or MGT data.

The principles of the invention may be applied to terrestrial, cable, satellite, Internet or computer network broadcast systems in which hierarchically structured program specific information is communicated. Such systems may include, for example, non-MPEG compatible systems, involving other types of encoded datastreams and other methods of conveying program specific information. Such other methods may employ transport structures including, for example, MPEG-PSI, Internet TCP/IP (Transport Control Protocol/Internet Protocol), DSS (Digital Satellite System), ATM (Asynchronous Transfer Mode) etc. Further, although the disclosed system is described as processing broadcast programs, this is exemplary only. The term 'program' is used to represent any form of packetized data such as audio data, telephone messages, computer programs, Internet data or other communications, for example.

Figure 3:
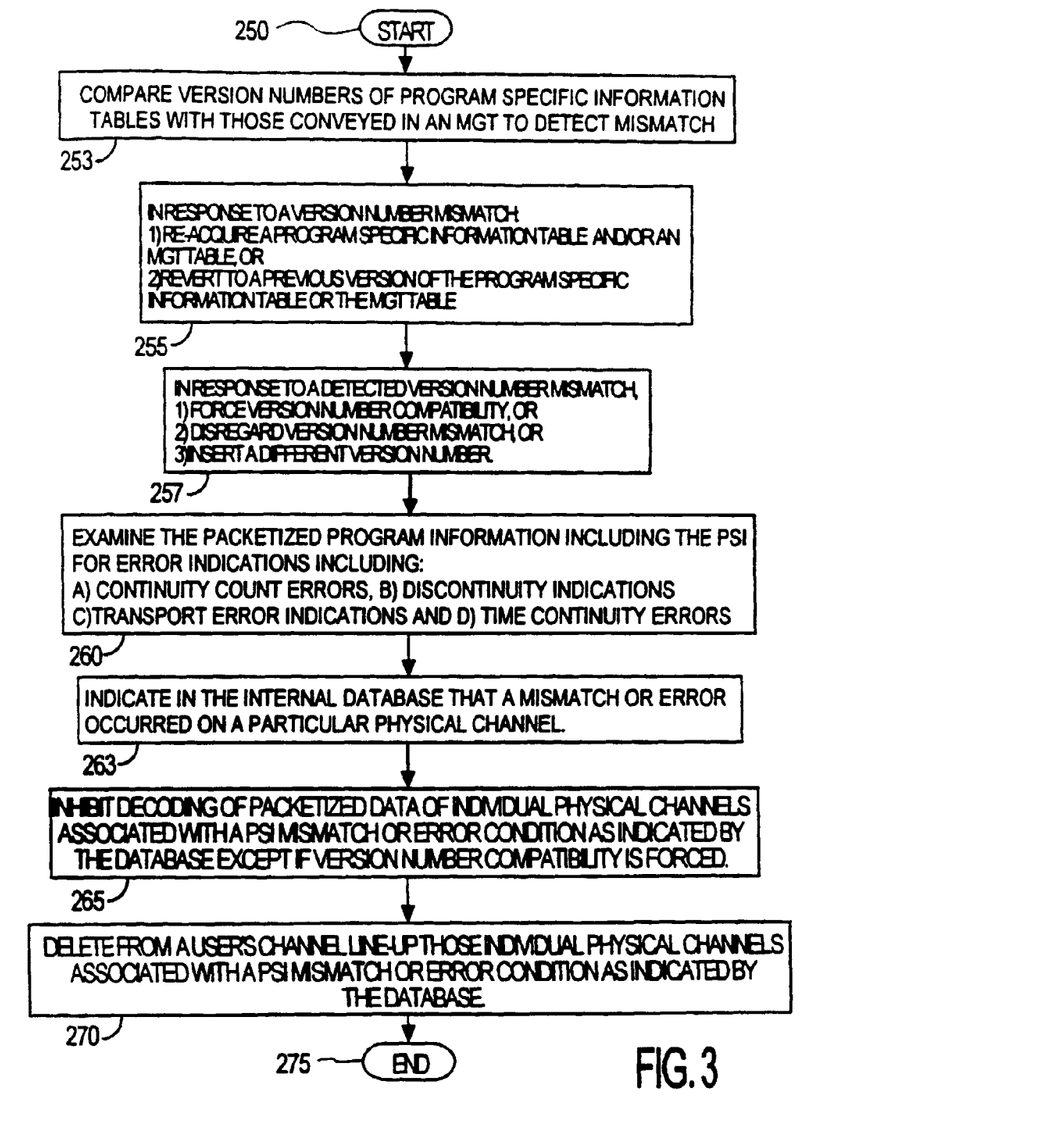
FIG. 3 shows a flowchart of a method for managing error conditions in processing program specific information for video and audio decoding applications, according to the invention.

FIG. 3 shows a flowchart of a method for managing version number incompatibility and other error conditions in processing program specific information for video and audio decoding applications. The method of FIG. 3 is used for processing the exemplary PSIP compatible MGT and VCT of FIGS. 1 and 2 respectively. The VCT processed in FIG. 3 associates RF or Physical Transmission Channels (PTCs) with sub-channels (also termed virtual or logical channels). Each Physical Transmission Channel (PTC) is allocated a 6 MHz bandwidth and contains, for example, up to 6 sub-channels. The FIG. 3 process is used in a decoder in acquiring program specific information including a PSIP compatible MGT and a VCT. The acquired program specific information is used for acquiring a User selected sub-channel and corresponding PTC. The process of FIG. 3 is used each time program specific information is updated, which typically occurs on a periodic basis, but also occurs upon User selection of a new channel on a different PTC to the PTC currently selected. If a User selects a different sub-channel associated with the already selected PTC it is unnecessary to acquire a new VCT.

Following the start at step 250 of FIG. 3, in step 253, version numbers of program specific information tables are compared with corresponding version numbers conveyed in an MGT in order to detect a mismatch. Specifically, a VCT version number (item 140 of FIG. 2) is compared with the corresponding VCT version number conveyed in an MGT (item 135 of FIG. 1).

In response to a detected mismatch, in step 255, the VCT (and/or MGT) is repetitively re-acquired for a limited number of times until the version number incompatibility is resolved. In another embodiment, a previous version of the VCT or MGT providing version number compatibility may be used in response to a detected mismatch. Alternatively, step 255 may be omitted with the process continuing at step 257.

In step 257, in response to a detected mismatch (with or without the table re-acquisition of step 255), the VCT version number and the corresponding version number conveyed in an MGT are advantageously forced to be compatible. This is done by substituting (or overwriting) the VCT version number conveyed in the MGT with the VCT version number conveyed in the VCT itself. Alternatively, this may be done by substituting (or overwriting) the VCT version number conveyed in the VCT with the VCT version number conveyed in the MGT. Therefore, when the MGT and VCT are checked for validity, the version numbers match and channel information from the VCT may be used in subsequent channel acquisition. As a further alternative, both the VCT version number conveyed in the MGT and the VCT version number conveyed in the VCT itself may be set to a common value that is different to either original version number. This common version number value may be employed to indicate that a mismatch condition has occurred in acquiring a VCT for a particular physical transmission channel. The common value may further be used to trigger application of special error detection and/or correction processing to the VCT (or MGT) to ensure that the VCT (or MGT) is not disabled from use by data corruption.

In another embodiment, in step 257, the detected version number incompatibility may be disregarded and the VCT information used for channel acquisition even though there is a version number incompatibility. In an alternative embodiment however, the version number incompatibility is only disregarded if there are no other error indications (as exemplified by those described in following step 260) of a disabling corruption of the VCT or MGT data.

The packetized program information is examined in step 260 for error indications. Specifically, the packetized program information (including program specific information) is examined for, (a) an MPEG continuity count error, (b) an MPEG discontinuity error, (c) an MPEG transport error, and (d) an error indicated by a variance between successive time stamps. These indicators are defined within the MPEG systems standard (e.g. in section 2.4.3.5 and other places) or the error indicators are derived from MPEG compatible parameters. The detection of such an error condition, or of a table version number mismatch condition, occurring on a particular physical transmission channel, is recorded in a database in step 263. Specifically, the database is updated in step 263 to associate a particular sub-channel and corresponding physical transmission channel with the detected error or mismatch condition.

In step 265, the decoding of the packetized program information is inhibited for those physical transmission channels associated with a version number mismatch or other error condition as indicated by the database. Therefore, if version number compatibility is being forced or is being disregarded in step 257 and no error condition is detected in step 260, then packetized program information is decoded in step 265 to provide a video or audio program for reproduction on a display or audio device. The database is further used in step 270 to delete those channels associated with a version number mismatch or error condition from a User's channel line-up. The channels associated with a fault condition may be deleted from a User's viewable channel line-up that is displayed in the form of an electronic program guide (EPG) or in the form of another channel list. Alternatively, the channels associated with a fault condition may be identified to a User by a visual indication in an EPG or other channel list as being associated with a fault condition (and may therefore indicate that the channel is unobtainable). Such fault indications may be advantageously used in a diagnostic or tuning procedure. The process of FIG. 3 may be employed as part of a scanning process for initializing a video decoder to determine a User's available channel line-up in a particular geographic location, for example. The process of FIG. 3 terminates at step 275.

Figure 4:
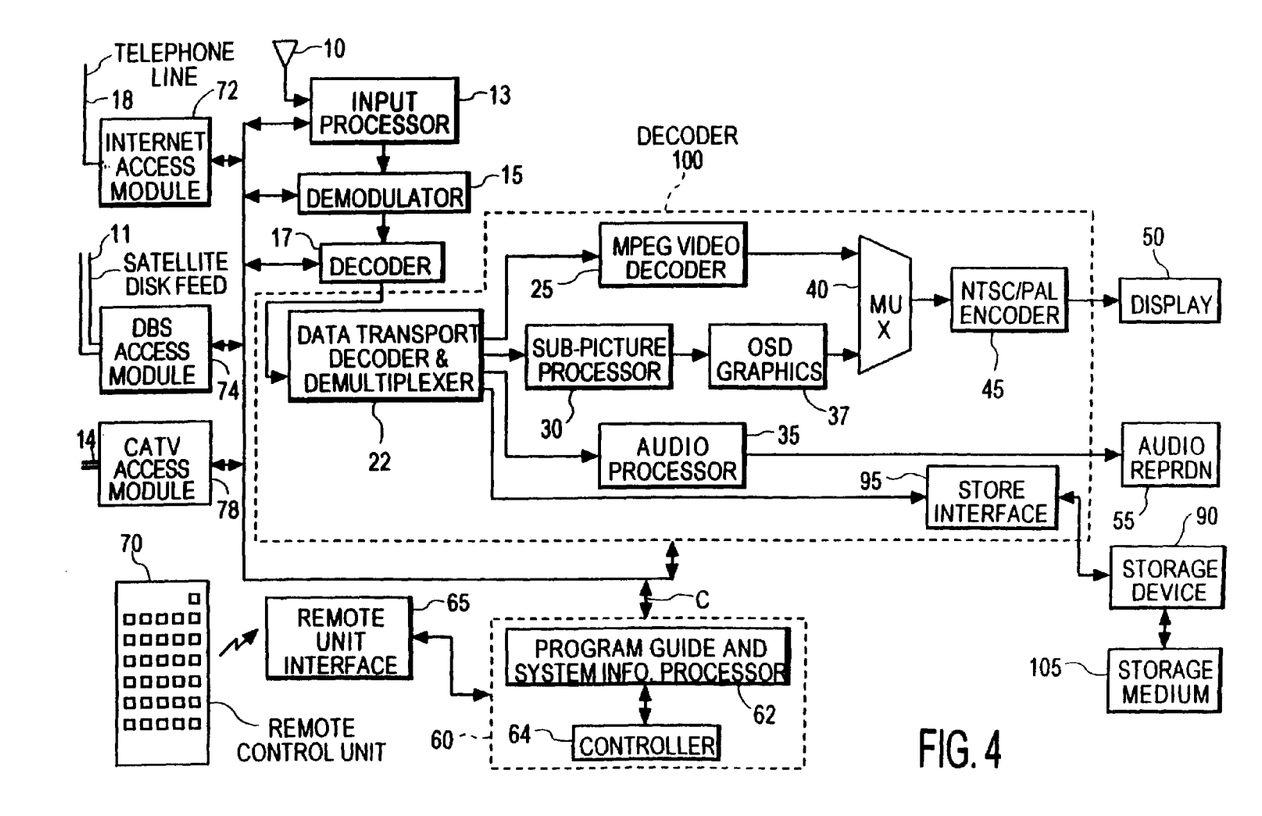
FIG. 4 shows a decoder system for decoding packetized program information using the process of FIG. 3, according to the invention.

FIG. 4 shows a block diagram of a digital video decoder system for decoding packetized program information using the process of FIG. 3. Specifically, the system of FIG. 4 demodulates and decodes broadcast (terrestrial, satellite, cable, or Internet) signals. In terrestrial mode, a carrier modulated with signals carrying program representative MPEG compatible audio, video and associated data received by antenna 10, is converted to digital form and processed by input processor 13. Processor 13 includes radio frequency (RF) tuner and intermediate frequency (IF) mixer and amplification stages for down-converting the input signal to a lower frequency band suitable for further processing. In this exemplary system, the terrestrial input signal received by antenna 10 contains 125 Physical Transmission Channels (PTCs 0-124). Each Physical Transmission Channel (PTC) is allocated a 6 MHz bandwidth and contains, for example, up to 6 sub-channels.

It is assumed for exemplary purposes that a video receiver user selects a sub-channel (SC) for viewing using remote control unit 70. Processor 60 uses the selection information provided from remote control unit 70 via interface 65 to appropriately configure the elements of decoder 100 to receive the PTC corresponding to the selected sub-channel SC. Following down conversion, the output signal from unit 13 for the selected PTC has a bandwidth of 6 MHz. In the following discussion, an RF channel or Physical Transmission Channel (PTC) refers to an allocated broadcaster transmission channel band which encompasses one or more sub-channels.

Processor 60 configures the radio frequency (RF) tuner and intermediate frequency (IF) mixer and amplification stages of unit 13 to receive the selected PTC using bi-directional control and signal bus C. The down-converted frequency output for the selected PTC is demodulated by unit 15. The primary functions of demodulator 15 are recovery and tracking of the carrier frequency, recovery of the transmitted data clock frequency, and recovery of the video data itself. Unit 15 also recovers sampling and synchronization clocks that correspond to transmitter clocks and are used for timing the operation of processor 13, demodulator 15 and decoder 17. The recovered output from unit 15 is provided to decoder 17.

The output from demodulator 15 is mapped into byte length data segments, deinterleaved and Reed-Solomon error corrected according to known principles by unit 17. In addition, unit 17 provides a Forward Error Correction (FEC) validity or lock indication to processor 60. Reed-Solomon error correction is a known type of Forward Error Correction. The FEC lock indication signals that the Reed-Solomon error correction is synchronized to the data being corrected and is providing a valid output. It is to be noted that the demodulator and decoder functions implemented by units 13, 15 and 17 are individually known and generally described, for example, in the reference text *Digital Communication*, Lee and Messerschmidt (Kluwer Academic Press, Boston, Mass., USA, 1988).

In other modes satellite, cable and Internet data is received on input lines 11, 14 and 18 and processed by interface access modules 74, 78 and 72 respectively. Interface modules 74, 78 and 72 incorporate interface functions for satellite, cable and Internet format data respectively. Such functions are known and detailed in applicable standards and other documents. These interface functions correspond to those performed by units 13, 15 and 17 in terrestrial mode. Further, in similar fashion to terrestrial mode, processor 60 configures units 74, 78, 72 and decoder 100 to receive satellite, cable or Internet data using bi-directional control and signal bus C. Decoder 100 processes the data conditioned by units 74, 78 or 72 in these other modes using similar functions as described for terrestrial mode.

The corrected output data from unit 17 is processed by MPEG compatible transport processor and demultiplexer 22. The individual packets that comprise either particular program channel content, or program specific information, are identified by their table identifiers (table Ids) and/or Packet Identifiers (PIDs). Processor 22 separates data according to type based on an analysis of Packet Identifiers (PIDs) contained within packet header information and provides synchronization and error indication information used in subsequent video, audio and data decompression.

The corrected output data provided to processor 22 is in the form of a transport datastream containing program channel content and program specific information for many programs distributed through several sub-channels. The program specific information in this exemplary description describes sub-channels present in a transport stream of a particular PTC. However, in another embodiment the program specific information may also describe sub-channels located in other PTCs and conveyed in different transport streams. Groups of these sub-channels may be associated in that their source is a particular broadcaster or they occupy the transmission bandwidth previously allocated to an analog NTSC compatible broadcast channel. Further, individual packets that comprise a selected program channel in the transport stream are identified and assembled by processor 60 operating in conjunction with processor 22 using PIDs contained in the program specific information.

The program specific information is acquired and assembled by processor 60, operating in conjunction with unit 22, from the datastream input from unit 17. Processor 60 determines from the FEC lock indication provided by unit 17 that valid data is being provided to transport processor 22. Thereupon, the program specific information MGT and VCT tables are identified and assembled using predetermined table ID and PID values stored within processor 60 internal memory. Using Control signal C, processor 60 configures transport processor 22 to select the data packets comprising the remaining program specific information including the EIT, ETT and NIT data. The tables may be acquired by processor 60 initiating communication with different sources (e.g. satellite, cable, or Internet sources), in different data formats and transmission protocols via different transmission media such as via satellite feed 11, cable line 14 or phone line 18.

Processor 22 matches the table IDs and PIDs (or other data identifiers e.g. TCP/IP identifiers, SCIDs etc.) of incoming packets provided by unit 17 (or units 72, 74 and 78 for Internet, cable or satellite data sources) with table ID and PID values pre-loaded in control registers within unit 22 by processor 60. Further, processor 60 accesses, parses and assembles the program specific information packets captured by processor 22 and stores the program specific information within its internal memory.

In acquiring and processing the hierarchically organized tables comprising the program specific information for the selected sub-channel SC, processor 60 employs the previously described process of FIG. 3. Processor 60 in conjunction with decoder 100 compares version numbers of program specific information tables with corresponding version numbers conveyed in the MGT in order to detect a mismatch. In response to a detected mismatch, processor 60 forces the VCT version number and the corresponding version number conveyed in the MGT to be compatible. For this purpose, processor 60 substitutes (or overwrites) the VCT version number conveyed in the MGT with the VCT version number conveyed in the VCT itself. Therefore, when the MGT and VCT are subsequently checked for validity, the version numbers match, and channel information from the VCT may be used in subsequent channel acquisition. Processor 60 also examines the captured packetized program information for error indications. Specifically, processor 60 examines the packetized program information (including program specific information) for MPEG continuity count, discontinuity and transport errors and also examines successive presentation time stamps (PTSs) for excessive variation. Processor 60 updates an internal database to indicate the detection of an error or table version number mismatch condition is associated with sub-channel SC and its corresponding physical transmission channel.

Processor 60 inhibits decoder 100 from decoding the packetized program information for those physical transmission channels associated with a version number mismatch or other error condition as indicated by the database. Therefore, if version number compatibility was previously forced and no error condition is detected decoder 100 decodes the packetized program information to provide a video or audio program for reproduction on display 50 or audio device 55. Processor 60 also employs the database to delete those channels associated with a version number mismatch or error condition from a User's channel line-up and electronic program guide (EPG) listing.

In response to a channel SC selection command from remote unit 70 via interface 65, processor 60 derives tuning parameters including PTC carrier frequency, demodulation characteristics, and sub-channel PIDs, from the acquired program specific information. Processor 60 uses this information in configuring units 13, 15, 17 and decoder 100 elements to acquire selected sub-channel (SC) program content.

The packetized decoded transport stream input to decoder 100 from unit 17 (or units 72, 74 or 78) contains video, audio and data representing TV programs, for example, and also contains sub-picture data. The sub-picture data contains picture elements associated with programs and channels selectable by a user for viewing including, multimedia objects, program guides, display commands, subtitling, selectable menu options or other items, for example. As such, the sub-picture data includes an EIT containing descriptive lists of programs (events) receivable on the sub-channels listed in a VCT and also contains an ETT containing text messages describing programs and program sub-channels.

The video, audio, data and sub-picture data being transmitted on terrestrial sub-channel SC, together with associated data from satellite, cable or Internet sources from units 74, 78 and 72, is acquired by processor 60 operating in conjunction with unit 22. This is achieved using the collated program specific information. Processor 60 identifies the video, audio, data and sub-picture data using respective PIDs (or other identifiers) determined from the VCT and descriptors. Processor 60 also initiates communication with other data sources (e.g. cable, satellite or Internet sources) in order to acquire video, audio, data and sub-picture data from these sources.

Processor 22, matches the PIDs (or other identifiers) of incoming packets provided by decoder 17 and interface units 72, 74 and 78 with identifier values of the video, audio and sub-picture data being transmitted on sub-channel SC and also being input via communication lines 11, 14 and 18. In this manner, processor 22 captures packets constituting the program transmitted on sub-channel SC and associated data and multimedia objects (e.g. advertisements, web page data, interactive icons etc.). Processor 22 forms these packets into MPEG compatible video, audio and sub-picture streams for output to video decoder 25, audio decoder 35 and sub-picture processor 30 respectively. The video and audio streams contain compressed video and audio data representing the selected sub-channel SC program content. The sub-picture data contains multimedia objects and EIT and ETT information associated with the sub-channel SC program content and program guide information.

Decoder 25 decodes and decompresses the MPEG compatible packetized video data from unit 22 and provides decompressed program representative pixel data to NTSC encoder 45 via multiplexer 40. Similarly, audio processor 35 decodes the packetized audio data from unit 22 and provides decoded and amplified audio data, synchronized with the associated decompressed video data, to device 55 for audio reproduction. Processor 30 decodes and decompresses sub-picture data including multimedia objects received from unit 22 to provide image representative multimedia object, text, caption and graphics data.

Processor 30 assembles and formats the decoded and decompressed multimedia object, text, caption and graphics data for output to On-Screen Display (OSD) and graphics generator 37. Unit 37 interprets and formats the multimedia objects and other data from unit 30 for presentation on unit 50. The formatted pixel mapped text and graphics data may represent multimedia objects or a program guide or other type of menu or user interface for subsequent display on unit 50. Unit 37 also processes EIT, ETT and other information to generate pixel mapped data representing, subtitling, control and information menu displays including selectable menu options, and other items, for presentation on unit 50. The control and information displays enable function selection and entry of device operating parameters for User operation of decoder 100.

The text and graphics produced by OSD generator 37 are generated in the form of overlay pixel map data under direction of processor 60. The overlay pixel map data from unit 37 is combined and synchronized with the decompressed pixel representative data from MPEG decoder 25 in encoder 45 via multiplexer 40 under direction of processor 60. Thereby multimedia objects such as advertisements, web page data, interactive icons etc. may be included in program content or program guides for display. Combined pixel map data representing a video program and associated multimedia objects together with associated sub-picture text message data is encoded by NTSC encoder 45 and output to device 50 for display.

In a storage mode of the system of FIG. 4, the corrected output data from unit 17 is processed by decoder 100 to provide an MPEG compatible datastream for storage. In this mode, a program is selected for storage by a user via remote unit 70 and interface 65. Processor 22, in conjunction with processor 60 forms condensed program specific information including MGT, VCT, EIT and ETT data. The condensed program specific information supports decoding of the program selected for storage but excludes unrelated information. Processor 60, in conjunction with processor 22 forms a composite MPEG compatible datastream containing packetized content data of the selected program and associated condensed program specific information. The composite datastream is output to storage interface 95.

Storage interface 95 buffers the composite datastream to reduce gaps and bit rate variation in the data. The resultant buffered data is processed by storage device 90 to be suitable for storage on medium 105. Storage device 90 encodes the buffered datastream from interface 95 using known error encoding techniques such as channel coding, interleaving and Reed Solomon encoding to produce an encoded datastream suitable for storage. Unit 90 stores the resultant encoded datastream incorporating the condensed program specific information on medium 105.

The architecture of FIG. 4 is not exclusive. Other architectures may be derived in accordance with the principles of the invention to accomplish the same objectives. Further, the functions of the elements of decoder 100 of FIG. 4 and the process steps of FIG. 3 may be implemented in whole or in part within the programmed instructions of a microprocessor. In addition, the principles of the invention apply to any form of MPEG or non-MPEG compatible electronic program guide. A datastream formed according to the invention principles may be used in a variety of applications including video server or PC type communication via telephone lines, for example. A program datastream with one or more components of video, audio and data formed to incorporate program specific information according to invention principles may be recorded on a storage medium and transmitted or re-broadcast to other servers, PCs or receivers.

The invention claimed is:

1. A method for operating a device to decode packetized program information including program specific information comprising a plurality of hierarchically ordered information tables, said method comprising:

detecting, via said device, a mismatch between a version number of a first table of said program specific information and a corresponding version number of said first table in a second table;

ensuring, via said device, compatibility of said version number of said first table as represented in said first and second tables in response to said detected mismatch using a forced compatible version number, wherein said forced compatible version number is generated without said device re-acquiring said first and second tables from a broadcast source; and decoding, via said device, said packetized program information using said program specific information including said forced compatible version number to provide a video program for display.

2. The method according to claim 1, wherein:

said first table comprises a channel map associating a transmission channel carrier frequency with data identifiers used to capture data streams constituting a program conveyed on a broadcast channel; and said second table contains information for acquiring program specific information conveyed in other tables including identifiers for identifying data packets comprising said first table.

3. The method according to claim 1, further comprised of:

examining said program specific information for error indications by examining at least one of: (a) an MPEG transport error indicator, (b) an MPEG discontinuity indicator, and (c) an MPEG continuity counter; and decoding said packetized program information in response to said examination indicating an error free condition.

4. The method according to claim 1, wherein said second table conveys a plurality of version numbers corresponding to version numbers conveyed in said plurality of hierarchically ordered information tables, and said detecting includes comparing individual version numbers of said plurality of hierarchically ordered information tables against corresponding individual version numbers conveyed in said second table.

5. The method according to claim 1, wherein said forced compatible version number is generated by overwriting, in a memory of said device, said first table version number in at least one of said first table and said second table.

6. The method according to claim 1, further comprised of said device acquiring at least one of: (a) a new version of said first table, and (b) a new version of said second table after said decoding is performed.

7. A method used to decode packetized program information including program specific information comprising a plurality of hierarchically ordered information tables comprising:
   detecting a mismatch between a version number of a first table of said program specific information and a corresponding version number of said first table in a second table;
   examining said program specific information for an error condition in addition to said detected mismatch;
   decoding said packetized program information in response to an absence of said error condition when said detected mismatch is the only detected error condition; and
   inhibiting decoding of said packetized program information in response to a presence of said error condition in addition to said detected mismatch.

8. The method according to claim 7, wherein said error condition is indicated by at least one of: (a) an MPEG transport error indicator, (b) an MPEG discontinuity indicator, and (c) an MPEG continuity counter.

9. The method according to claim 7, wherein said second table conveys a plurality of version numbers corresponding to version numbers conveyed in said plurality of hierarchically ordered information tables, and said detecting includes comparing individual version numbers of said plurality of hierarchically ordered information tables against corresponding individual version numbers conveyed in said second table.

10. An apparatus for decoding packetized program information including program specific information comprising a plurality of hierarchically ordered information tables, said apparatus comprising:
    a processor configured to detect a mismatch between a version number of a first table of said program specific information and a corresponding version number of said first table in a second table;
    said processor configured to ensure compatibility of said version number of said first table as represented in said first and second tables in response to said detected mismatch using a forced compatible version number, wherein said forced compatible version number is generated without said apparatus re-acquiring said first and second tables from a broadcast source; and
    said processor configured to decode packetized program information using said program specific information including said forced compatible version number to provide a video program for display.

11. The apparatus according to claim 10, wherein:
    said first table comprises a channel map associating a transmission channel carrier frequency with data identifiers used to capture data streams constituting a program conveyed on a broadcast channel; and
    said second table contains information for acquiring program specific information conveyed in other tables including identifiers for identifying data packets comprising said first table.

12. The apparatus according to claim 10, wherein said processor is configured to:
    examine said program specific information for error indications by examining at least one of: (a) an MPEG transport error indicator, (b) an MPEG discontinuity indicator, and (c) an MPEG continuity counter; and
    decode said packetized program information in response to said examination indicating an error free condition.

13. The apparatus according to claim 10, wherein said second table conveys a plurality of version numbers corresponding to version numbers conveyed in said plurality of hierarchically ordered information tables, and said processor is configured to compare individual version numbers of said plurality of hierarchically ordered information tables against corresponding individual version numbers conveyed in said second table.

14. The apparatus according to claim 10, wherein said processor is configured to overwrite said first table version number in at least one of said first table and said second table.

15. The apparatus according to claim 10, wherein said processor is configured to acquire at least one of: (a) a new version of said first table, and (b) a new version of said second table after said decoding is performed.

16. An apparatus operative to decode packetized program information including program specific information comprising a plurality of hierarchically ordered information tables, said apparatus comprising:
    a processor configured to detect a mismatch between a version number of a first table of said program specific information and a corresponding version number of said first table in a second table;
    said processor configured to examine said program specific information for an error condition in addition to said detected mismatch;
    said processor configured to decode said packetized program information in response to an absence of said error condition when said detected mismatch is the only detected error condition; and
    said processor inhibits decoding of said packetized program information in response to a presence of said error condition in addition to said detected mismatch.

17. The apparatus according to claim 16, wherein said error condition is indicated by at least one of: (a) an MPEG transport error indicator, (b) an MPEG discontinuity indicator, and (c) an MPEG continuity counter.

18. The apparatus according to claim 16, wherein said second table conveys a plurality of version numbers corresponding to version numbers conveyed in said plurality of hierarchically ordered information tables, and said processor is configured to compare individual version numbers of said plurality of hierarchically ordered information tables against corresponding individual version numbers conveyed in said second table.

* * * * *